(12) United States Patent
Muster et al.

(10) Patent No.: US 11,338,350 B2
(45) Date of Patent: May 24, 2022

(54) METHOD FOR PERMANENTLY FASTENING CAMS ON A CARRIER TUBE

(71) Applicants: THYSSENKRUPP PRESTA TECCENTER AG, Eschen (LI); thyssenkrupp AG, Essen (DE)

(72) Inventors: Manfred Muster, Ludesch (AT); Thomas Rogatsch, Feldkirch (AT); Gunther Martin Lugauer, Feldkirch (AT)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 786 days.

(21) Appl. No.: 15/779,729

(22) PCT Filed: Nov. 30, 2016

(86) PCT No.: PCT/EP2016/079177
§ 371 (c)(1),
(2) Date: May 29, 2018

(87) PCT Pub. No.: WO2017/097636
PCT Pub. Date: Jun. 15, 2017

(65) Prior Publication Data
US 2020/0306814 A1    Oct. 1, 2020

(30) Foreign Application Priority Data
Dec. 10, 2015   (DE) .................. 10 2015 224 905.0

(51) Int. Cl.
*F16H 53/02*    (2006.01)
*B21D 39/06*    (2006.01)
*B21D 39/20*    (2006.01)

(52) U.S. Cl.
CPC ............. *B21D 39/06* (2013.01); *B21D 39/20* (2013.01); *F16H 53/025* (2013.01);
(Continued)

(58) Field of Classification Search
CPC . B23P 11/005; B23P 2700/02; F16C 2226/10; F16C 2226/12
See application file for complete search history.

(56) References Cited

U.S. PATENT DOCUMENTS 4,597,365 A    7/1986  Madaffer
4,620,454 A *  11/1986 Sugiuchi ............... B21D 39/04
                                                    403/277
(Continued)

FOREIGN PATENT DOCUMENTS

CN    101915134 A    12/2010
DE    93 20 451 U    9/1994
(Continued)

OTHER PUBLICATIONS

English Translation of International Search Report issued in PCT/EP2016/079177, dated Mar. 3, 2017 (dated Mar. 10, 2017).

*Primary Examiner* — Christopher J Besler
(74) *Attorney, Agent, or Firm* — thyssenkrupp North America, LLC

(57) ABSTRACT

A method for permanently fastening a cam on a cam carrier may involve positioning the cam on the cam carrier in a predefined axial and angular position. By way of the positioning, an end face of the cam carrier is aligned with an end face of the cam. The method may also involve positioning a cam segment formed by the cam carrier and the cam in an assembly device. The cam carrier may then be deformed such that the cam is secured at least in a form-fitting or force-fitting manner against movement in an axial direction on the cam carrier. A deformation tool of the assembly device may be advanced in an axial direction onto the end
(Continued)

face of the cam carrier, and the cam carrier may be deformed such that material of the cam carrier is forced outward in a radial direction against the cam.

9 Claims, 2 Drawing Sheets

(52) U.S. Cl.
CPC ..... *B23P 2700/02* (2013.01); *Y10T 29/49293* (2015.01); *Y10T 29/49908* (2015.01)

(56) References Cited

U.S. PATENT DOCUMENTS

| | | | |
|---|---|---|---|
| 4,809,562 A | | 3/1989 | Bendoraitas |
| 4,875,270 A | * | 10/1989 | Krips .................. F16H 53/025 |
| | | | 29/421.1 |
| 5,406,686 A | * | 4/1995 | Hochstein .............. B21D 26/08 |
| | | | 29/252 |
| 2011/0120401 A1 | | 5/2011 | Scherzinger |

FOREIGN PATENT DOCUMENTS

| | | |
|---|---|---|
| DE | 10 2008 028 513 A | 12/2009 |
| DE | 10 2009 052 222 A | 5/2011 |
| EP | 0325732 A | 8/1989 |
| EP | 0 340 128 A | 11/1989 |
| FR | 3 018 104 A | 9/2015 |
| JP | H05-248418 A | 9/1993 |
| JP | H06-299808 A | 10/1994 |
| JP | 2010-051975 A | 3/2010 |

\* cited by examiner

METHOD FOR PERMANENTLY FASTENING CAMS ON A CARRIER TUBE

CROSS REFERENCE TO RELATED APPLICATIONS

This application is a U.S. National Stage Entry of International Patent Application Serial Number PCT/EP2016/079177, filed Nov. 30, 2016, which claims priority to German Patent Application No. DE 10 2015 224 905.0, filed Dec. 10, 2015, the entire contents of both of which are incorporated herein by reference.

FIELD

The present disclosure generally relates to camshafts, including methods and assembly devices for permanently fastening cams on cam carriers.

BACKGROUND

It is known for camshafts, in particular for controlling the gas exchange valves in internal combustion engines, to be of multi-part construction. Here, a base camshaft is manufactured as a tube, and the various cams and other components, such as for example encoders for rotational angle sensors, are manufactured separately. The elements are then placed onto the tube and fastened there by pressing or calking in a radial direction. An example of this type of construction of an assembled camshaft with a tubular base camshaft and individually placed-on cams that are fastened by calking in a radial direction is known from EP 0340128 B1. The radial direction and the axial direction are each defined in relation to the provided axis of rotation of the camshaft during operation.

In particular, it is also known to produce a valve drive with a base camshaft equipped with an external toothing, on which base camshaft there are displaceably arranged cam carriers which are equipped with a complementary internal toothing running in an axial direction. The cam carriers are then, as described above, manufactured from a tubular main body with separate lifting cams placed thereon. The joining of the cam carrier to the individual cams must in this case be performed such that the individual cams are arranged rotationally fixedly in a circumferential direction on the cam carrier and are axially non-displaceable, even under high-temperature loading. Here, a purely force-fitting seat causes problems in some operating states. This type of construction of a valve drive with an externally toothed base camshaft and a cam carrier axially displaceable thereon is known from DE 10 2008 028 513 A1.

The method from EP 0340128 B1 for fastening the cams on the base camshaft is not suitable for the axially displaceable cam carriers, because the calking in a radial direction can deform the internal toothing of the cam carrier and can thus impair the easy displaceability of the cam carrier on the externally toothed base camshaft. Furthermore, in the case of this method, it is necessary for the tube of the base camshaft to protrude axially out of the cam to be fastened thereto.

Thus a need exists for a method for fastening cams to a tubular cam carrier, which method reliably ensures the required fastening in a circumferential direction and in an axial direction.

DETAILED DESCRIPTION

Figure 1:
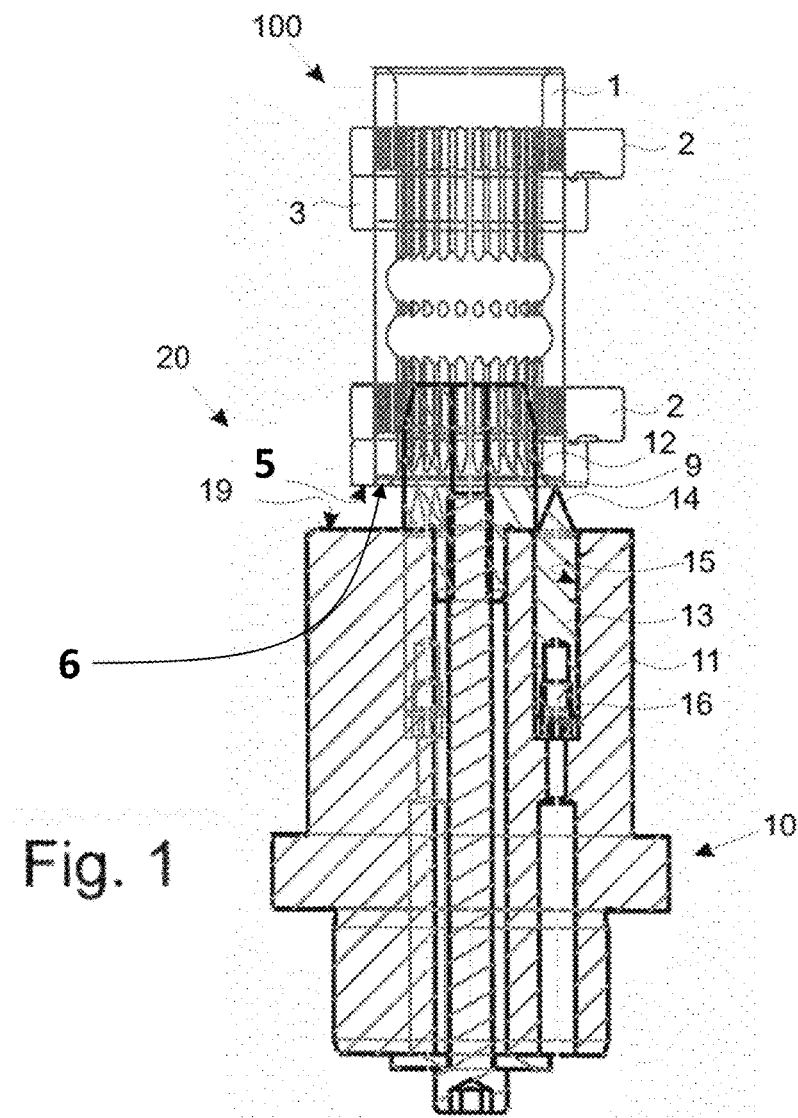
FIG. 1 is a lateral sectional view of an example assembly device with an example cam segment before axial calking.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Further features and details of the invention will emerge from the subclaims, from the description and from the drawings. Here, features and details that are described in conjunction with the method according to the invention self-evidently also apply in conjunction with the assembly device according to the invention and vice versa in each case, such that reference is always or can always be made reciprocally with respect to the disclosure of the individual aspects of the invention. Furthermore, the method according to the invention can be carried out using the assembly device according to the invention.

The method according to the invention for permanently fastening at least one cam on a cam carrier comprises at least the following method steps:
a) positioning the at least one cam on the cam carrier in a predefined axial and angular position such that the cam carrier extends at least in sections through a passage bore of the cam, wherein an end face of the cam carrier is aligned with an end face of the cam,
b) arranging the cam segment formed from the cam carrier and the at least one cam in an assembly device, and
c) deforming the cam carrier such that the at least one cam is secured at least in a force-fitting or form-fitting manner against movement in an axial direction on the cam carrier, wherein a deformation tool of the assembly device is advanced in an axial direction onto the end face of the cam carrier, and the cam carrier is deformed such that material of the cam carrier is forced outward in a radial direction against the cam that has been placed on.

Because, in the method according to the invention, using a deformation tool that is advanced in an axial direction onto the end face of the cam carrier, the cam carrier is deformed such that material of the cam carrier is forced outward in a radial direction against the cam that has been placed on, the cam is in particular secured in an axial direction against being pulled off the cam carrier. The assembly device is advantageously used for arranging the cam on the cam carrier. It is furthermore conceivable for multiple cams to be arranged on a cam carrier. It is advantageously the case that each cam comprises at least one cam track. It is however also possible for each cam to comprise two or more axially mutually adjacent arranged cam tracks in order to make it possible for the opening and closing of the valves of an internal combustion engine and the time and the stroke to be changed or varied.

By means of the method according to the invention, as a result of a deformation of the wall of the cam carrier, at least a force-fitting connection between the cam, in particular the surface in the region of the passage bore of the cam, and the wall of the cam carrier is made possible. Based on a static friction force that is generated, owing to the radially outward bulging of the wall of the cam carrier in the direction of the cam arranged on the cam carrier, at least a movement of the cam in an axial direction along the cam carrier, and advantageously also a rotational movement in a circumferential direction around the cam carrier, are prevented.

In the context of the invention, it is furthermore conceivable for the material of the cam carrier to be, in step c), forced radially outward such that said material is forced into a depression of the cam, which depression is formed on the passage bore, provided for the placement of the cam onto the cam carrier, of the cam. The cam is thus advantageously secured not only in force-fitting fashion but at least in sections also in form-fitting fashion against pulling-off forces in an axial direction. Here, the depression extends at least in sections within the passage bore of the cam element. The depression is advantageously formed in the manner of a groove, which may comprise a varying geometrical shape.

It is furthermore conceivable for the material of the cam carrier to be, in step c), forced into a depression formed in an encircling manner in the passage bore. Accordingly, the depression advantageously extends for example in the form of a groove in encircling fashion as viewed in a circumferential direction within the passage bore, such that a form-fitting connection between the cam and the cam carrier can be produced which is fully circumferential as viewed in the circumferential direction. It is furthermore conceivable for the depression to be formed in the manner of a bevel which is formed as a chamfered surface at the edge of the cam in the region of the passage bore and which furthermore enables the cam to be pushed easily onto the cam carrier.

In the context of the invention, it is furthermore conceivable for the cam segment to be, in step b), placed onto a central peg of the deformation tool. Said central peg advantageously extends, proceeding from an end face of the deformation tool, substantially in an axial direction away from said end face. The peg advantageously comprises a bevel, in particular an insertion chamfer, in order to allow the cam segment composed of the cam carrier and of the at least one cam arranged on the cam carrier to be easily placed on. The peg advantageously serves as a centring element for permitting the positionally accurate arrangement of the cam segment on the deformation tool. For this purpose, it is advantageous if the cam carrier is designed to terminate flush in an axial direction with the cam to be fastened. In this embodiment, the calking in an axial direction does not give rise to a projecting length, such that the cam carrier with the cams mounted thereon forms an optimally short assembly. This advantage cannot be attained for example in the case of the radial calking for the fastening of cams on a base camshaft in accordance with the prior art mentioned in the introduction.

Also claimed is an assembly device for permanently fastening at least one cam on a cam carrier in order to produce a cam segment. The assembly device according to the invention comprises at least one deformation tool for deforming the cam carrier such that the at least one cam is secured at least in a force-fitting or form-fitting manner against movement in an axial direction on the cam carrier.

The assembly device advantageously also comprises a holding element, in particular a gripping element, for positioning the cam segment relative to the deformation tool. The holding element is advantageously arranged so as to be movable relative to the deformation tool. In this way, the deformation tool is movable in the direction of the holding element, or the holding element is movable in the direction of the deformation tool.

It is accordingly furthermore possible for the deformation tool to be capable of being advanced in an axial direction onto the end face of the cam carrier in order to deform the cam carrier such that material of the cam carrier is forced outward in a radial direction against the cam that has been placed on. Here, the holding element advantageously serves as a counterpart to the deformation tool and accordingly imparts an opposing force, which permits a deformation of the cam carrier.

The deformation tool advantageously comprises at least one deformation element which, proceeding from an end face of the deformation tool, extends in an axial direction away from said end face. By means of the deformation element, it is made possible for the material of the cam carrier to be forced radially outward in the direction of the cam arranged on the cam carrier. It is thus conceivable for the deformation element to be of continuous form, as viewed in a circumferential direction, on the end face or on a circumferential wall of the deformation tool. In this way, a fully circumferential deformation of the material of the cam carrier is advantageously also made possible in that section of the cam carrier into which the deformation element engages. For this purpose, a deformation which is fully circumferential as viewed in the circumferential direction is advantageously realized in the region of the end face of the cam carrier, which is advantageously aligned with the end face of the arranged cam.

It is also possible for the deformation element to be formed in the manner of a single projection, in particular a pin-like projection. In this way, a deformation of the wall of the cam carrier takes place only in punctiform fashion.

It is furthermore conceivable for the deformation tool to comprise a multiplicity of deformation elements which are arranged on the deformation tool at uniform angular intervals in a circumferential direction. In this way, a deformation of the wall of the cam carrier, and consequently a generation of an at least punctiform force fit or form fit or force/form fit, are realized at points which are evenly spaced apart from one another. Consequently, the risk of insecure hold of the cam on the cam carrier is advantageously avoided owing to a multiplicity of force-fit or form-fit regions being used.

In the context of the invention, it is conceivable for the deformation element to be formed as a blade with a tip. Said tip is advantageously of wedge-shaped or conical form. It is furthermore possible for the deformation tool to comprise at least three blades distributed over the circumference with in each case one preferably wedge-shaped or conical tip, which tips are suitable for deforming the cam carrier at its end face. In the context of the invention, the expression "blade" is used for tool elements which, with a rounded or sharp front side which is small at the end face, are suitable for deforming the material of the cam carrier. Here, for a uniform fastening of the cams to the cam carrier, it is advantageous if the blades are arranged at uniform angular intervals in the circumferential direction of the tool.

The deformation tool advantageously comprises exchangeable deformation elements, such as for example blades. The at least one deformation element is advantageously arranged in an axially parallel bore of the deformation tool. Said bore is for example of linear form and oriented axially parallel with respect to the axis of symmetry of the assembly device or of the deformation tool.

A deformation of the cam is in this case not necessary and also not desired, because the cams are hardened components which could be damaged as a result of a deformation during the above-described joining process.

All of the advantages that have already been discussed with regard to the method according to the invention according to the first aspect of the invention also arise in the case of the assembly device according to the invention.

Figure 2:
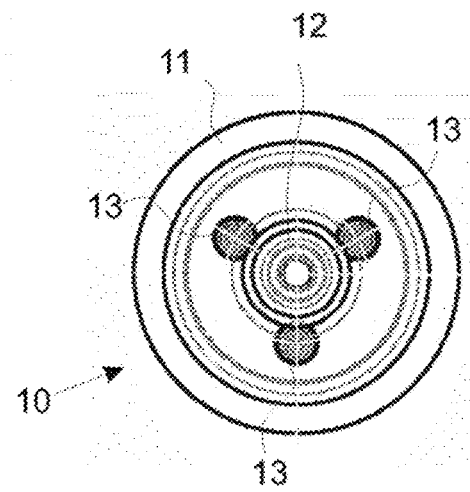
FIG. 2 is a plan view from above of the example assembly device of FIG. 1 with an example cam segment.
Figure 3:
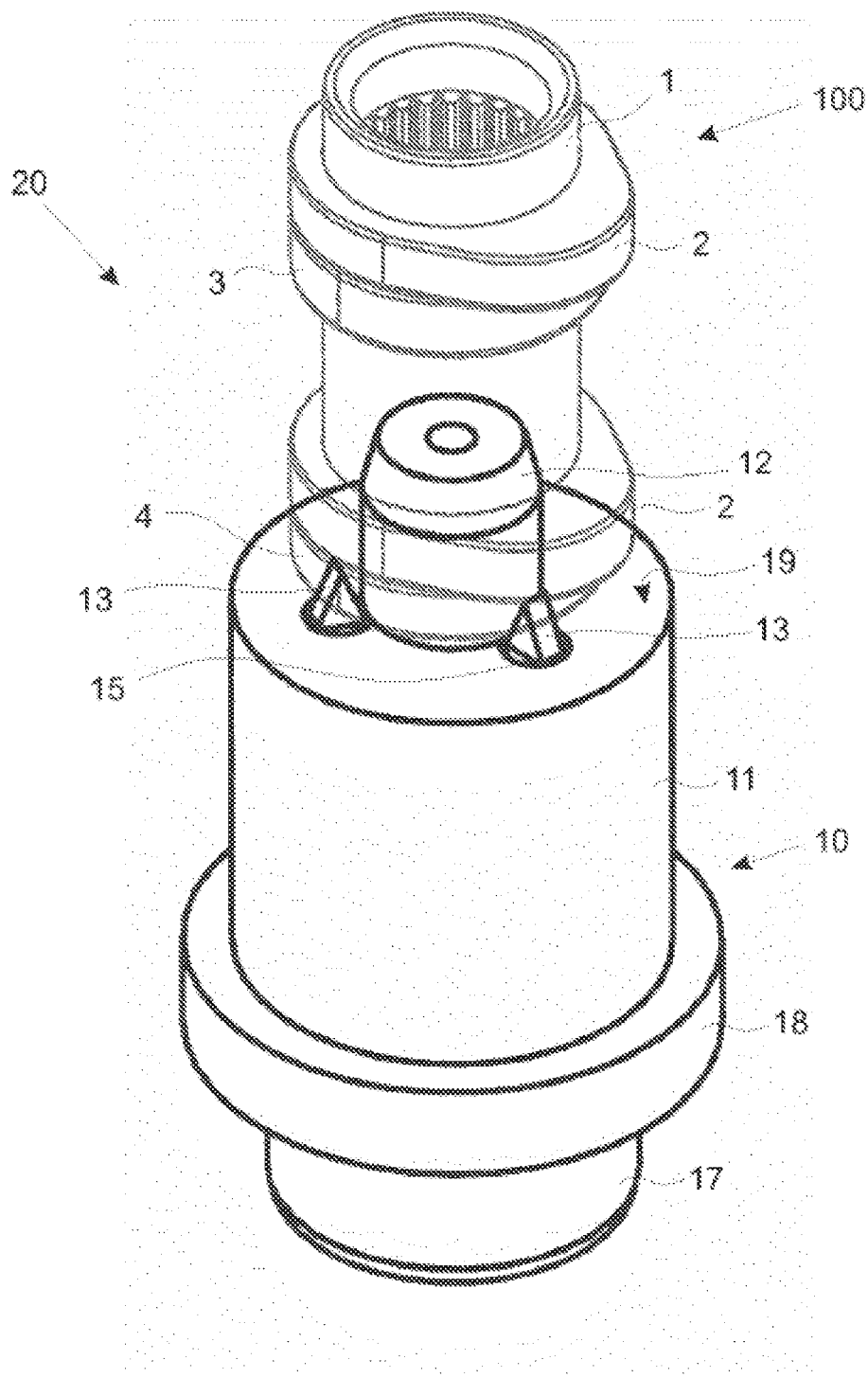
FIG. 3 is a perspective view of the example assembly device of FIGS. 1 and 2 with an example cam segment.

Features and details with identical function and action are denoted here by the same reference designations in FIGS. 1 to 3.

FIG. 1 shows, as an example for the realization of the method according to the invention, an embodiment of an assembly device 20 according to the invention. On the assembly device 20, in particular on the deformation tool 10 of the assembly device 20, there has been placed a cam segment 100, as illustrated in FIG. 1 in a longitudinal section along the axis of symmetry. The cam segment 100 comprises an internally toothed cam carrier 1 and cams 2, 3, 4 placed thereon. Here, two of the cams 2, 3, 4 form so-called zero-lift cams, which are denoted by the reference designations 3 and 4. One of the zero-lift cams, which is denoted by the reference designation 4, has been arranged on the cam carrier 1, and pre-mounted for example with an interference fit, such that its axial end face 5 is aligned substantially flush with an axial end face 6 of the cam carrier 1. It is an object of the method according to the invention to securely fasten the cam 4 on the cam carrier 1 at least in an axial direction.

For this purpose, the deformation tool 10 is arranged coaxially with the above-described workpiece, that is to say the cam segment 100. In the embodiment shown in FIG. 1, the deformation tool 10 comprises an approximately rotationally symmetrical main body 11. Proceeding from an end face 19, which can face toward the cam segment 100, of the deformation tool 10, in particular of the main body 11 thereof, a peg 12 extends coaxially away from the main body 11. The peg 12 advantageously serves for holding and centering the cam segment 100 on the deformation tool 10. Furthermore, in the main body 11, there are arranged a number of deformation elements 13 which are formed for example in the manner of a blade. In the embodiment shown in FIG. 1, a total of three deformation elements 13 are provided. In this exemplary embodiment, the deformation elements 13 comprise a wedge-shaped tip 14, wherein the end edge of the wedge-shaped tip 14 runs in a tangential direction with respect to the workpiece. The deformation elements 13 are inserted in each case into corresponding bores 15 of the deformation tool 10 and are supported there in an axial direction. The fastening of the deformation elements 13 in the main body 11 may be realized in a variety of ways, for example by means of screws 16.

FIG. 2 illustrates the deformation tool 10 in a view of the end face facing toward the cam segment 100, which in FIG. 1 is situated at the top. The substantially rotationally symmetrical construction of the deformation tool 10 can be seen. In particular, in this embodiment, a number of altogether three deformation elements 13 are provided, which are distributed at equal angular intervals of advantageously 120° in a circumferential direction.

FIG. 3 shows, in a perspective view, the arrangement from FIGS. 1 and 2, wherein the cam segment 100 is illustrated in transparent form.

The assembly device 20 advantageously also comprises, in addition to the deformation tool 10, a holding element (not shown here) which serves for holding and positioning the cam segment 100 relative to the deformation tool 10. Said holding element is designed to be movable relative to the deformation tool 10 such that an arrangement of the cam segment 100 on the deformation tool 10 can be made possible. Furthermore, the holding element advantageously makes it possible for the cam element 100 to be supported in an axial direction, such that a corresponding axial force can be imparted to the cam segment 100 by means of the deformation tool 10.

It is furthermore conceivable for the assembly device 20 to also comprise a drive device (not shown here) for axially moving the deformation tool 10. For this purpose, the deformation tool 10 comprises an attachment region 17 for the attachment of the drive device of the assembly device 20, and an encircling collar 18 for supporting drive forces.

In the method according to the invention, the following procedure is followed:

Firstly, the cam carrier 1 is equipped with the cams 2 and the zero-lift cams 3 and 4, and a cam segment 100 is formed. Here, the cams 2, 3, 4 may already be placed with an interference fit onto the cam carrier 1. Here, the cam 4 is aligned such that its end face 5 facing toward the deformation tool 10 is aligned flush in one plane with the corresponding end face 6 of the cam carrier 1. Then, the cam segment 100 is placed in a centered manner onto the peg 12 of the deformation tool 10. Here, the deformation elements 13 lie with their end edges against the end face 6 of the cam carrier 1. Contact with the cam 4 is not provided.

The end edges of the deformation elements 13 are preferably situated approximately centrally on the ring-shaped end face 6 of the cam carrier 1. The cam carrier 1 is then supported in an axial direction, and a force on the deformation tool 10 is applied in an axial direction to the cam carrier 1. The deformation elements 13 penetrate with their edges into the material of the cam carrier 1 and deform the latter outward in a radial direction, such that the material can for example ingress into a depression 9 formed in the passage bore of the cam 4, such as advantageously a bevel formed on the end face on the cam 4. The cam carrier 1 is thus flared slightly at least in punctiform fashion and secures cam 4, in particular the zero-lift cam 4 shown in FIGS. 1 and 3, against being undesirably pulled off in an axial direction, specifically even in the presence of extreme temperatures such as may be encountered during operation, which could, owing to the different materials of the cam carrier 1 and of the cams 2, 3 and 4, lead to loosening of the interference fit.

The ingress of the material of the cam carrier 1 into the inner free cross section is advantageously firstly prevented by virtue of the cam carrier 1 comprising, for example, a relatively large bevel on the inner side at the end face, such that even a deformation in the region of the end face 6 does not result in material ingressing into the inner free cross section of the cam carrier 1, because this would possibly impede the displaceability of the cam carrier 1 on the externally toothed base camshaft.

In the described method step of the calking in an axial direction, the entire deformation tool 10 with the deformation elements 13 supported therein is pressed against the cam segment 100. Provision may also be made for the deformation elements 13 to be arranged movably in the bores 15 of the deformation tool 10 and to be pressed by in each case one dedicated drive device against the cam segment 100. Said drive device may be hydraulic or mechanical.

The design of the deformation elements 13 may also, in a departure from the wedge-shaped form illustrated, be implemented for example with a curved cutting edge running in a circumferential direction. The deformation elements 13 may ultimately also be conical or pyramid-shaped with a pronounced tip, whereby the deformation forces can be reduced, without jeopardizing the secure hold of the zero-lift cam 4 on the cam carrier 1 after the joining process.

What is claimed is:

1. A method for permanently fastening a cam on a cam carrier, the method comprising:
positioning the cam on the cam carrier in a predefined axial and angular position such that the cam carrier extends through a passage bore of the cam, wherein an end face of the cam carrier is aligned with an end face of the cam;
positioning a cam segment comprising the cam carrier and the cam in or on an assembly device; and
deforming the cam carrier such that the cam is secured at least in a form-fitting manner or a force-fitting manner against movement in an axial direction on the cam carrier, wherein a deformation tool of the assembly device is advanced in the axial direction onto a planar portion of the end face of the cam carrier between an inner circumferential edge and an outer circumferential edge of the cam carrier, the deformation tool deforming the cam carrier such that material of the cam carrier is forced outward in a radial direction against the cam.

2. The method of claim 1 wherein deforming the cam carrier comprises forcing material of the cam carrier radially outward into a depression of the cam, wherein the depression is formed on the passage bore, provided for placement of the cam onto the cam carrier, of the cam.

3. The method of claim 1 wherein deforming the cam carrier comprises forcing the material of the cam carrier radially outward into a depression of the cam formed on the passage bore.

4. The method of claim 1 wherein deforming the cam carrier comprises forcing the material of the cam carrier radially outward into a depression of the cam formed on the passage bore, the depression being disposed in an encircling manner in the passage bore.

5. The method of claim 1 wherein positioning the cam segment comprises placing the cam segment onto a central peg of the deformation tool of the assembly device.

6. The method of claim 5 wherein positioning the cam segment in the assembly device comprises placing a central peg of the deformation tool of the assembly device within the cam segment, wherein the cam carrier is deformed such that material of the cam carrier is forced outward in the radial direction against the cam while the central peg is positioned within the cam segment and while the central peg is prevented from rotating, wherein a part of the deformation tool that deforms the cam carrier is different than the central peg of the deformation tool.

7. The method of claim 5 wherein positioning the cam segment on the cam carrier comprises aligning the end face of the cam carrier and the end face of the cam to be coplanar before deforming the cam carrier.

8. A method for permanently fastening a cam on a cam carrier that extends axially, the method comprising:
positioning the cam on the cam carrier in a predefined axial and angular position such that the cam carrier extends through a passage bore of the cam, wherein an end face of the cam carrier is axially aligned with an end face of the cam such that the end face of the cam carrier and the end face of the cam are coplanar;
positioning a cam segment comprising the cam carder and the cam in or on an assembly device; and
deforming the cam carder such that the cam is secured at least in a form-fitting manner or a force-fitting manner against movement in an axial direction on the cam carrier, wherein a deformation tool of the assembly device is advanced in the axial direction onto a planar portion of the end face of the cam carrier between an inner circumferential edge and an outer circumferential edge of the cam carders the deformation tool deforming the cam carrier such that material of the cam carder is forced outward in a radial direction against the cam.

9. The method of claim 8 wherein the cam carrier is deformed while a central peg is positioned within the cam segment and is prevented from rotating.

* * * * *